United States Patent [19]

Bowman et al.

[11] Patent Number: 5,292,469
[45] Date of Patent: Mar. 8, 1994

[54] PROCESS FOR COAGULATION, WASHING AND LEACHING OF SHAPED POLYBENZAZOLE ARTICLES

[75] Inventors: Reid H. Bowman, Walnut Creek; Willie E. Rochefort, Hercules; Ming-Biann Liu, Clayton; Peter E. Pierini, Berkeley, all of Calif.

[73] Assignee: The Dow Chemical Company, Midland, Mich.

[21] Appl. No.: 847

[22] Filed: Jan. 5, 1993

[51] Int. Cl.5 .............................................. B29C 71/02
[52] U.S. Cl. ................................... 264/169; 264/184; 264/233; 264/331.11; 264/331.12; 264/344; 528/183
[58] Field of Search ............... 264/233, 184, 331.11, 264/344, 211.15, 211.16, 169, 331.12; 528/183

[56] References Cited

U.S. PATENT DOCUMENTS

| | | | |
|---|---|---|---|
| 3,619,453 | 11/1971 | Riggs | 264/344 |
| 3,699,038 | 10/1972 | Boom | 264/344 |
| 4,554,119 | 11/1985 | Chenevey | 264/184 |
| 4,606,875 | 8/1986 | Chenevey et al. | 528/185 |
| 4,717,619 | 1/1988 | Letinski | 264/331.11 |
| 4,898,924 | 2/1990 | Chenevey et al. | 264/233 |
| 4,973,442 | 11/1990 | Harvey et al. | 264/233 |
| 4,977,223 | 12/1990 | Arnold et al. | 525/432 |
| 5,102,601 | 4/1992 | Farris et al. | 264/184 |
| 5,164,131 | 11/1992 | Chau et al. | 264/28 |

FOREIGN PATENT DOCUMENTS

WO9210527 6/1992 World Int. Prop. O. .......... 264/184

Primary Examiner—Jeffery Thurlow

[57] ABSTRACT

Articles (other than fiber) made from polybenzazole dopes can quickly be washed to remove polyphosphoric acid by a combination of initially washing with an acidic liquid and second washing with a hot leaching fluid at at least about 60° C. The process can reach acceptable residual phosphorous levels (1500–2000 ppm) in as little as about 2 or 3 minutes.

23 Claims, No Drawings

PROCESS FOR COAGULATION, WASHING AND LEACHING OF SHAPED POLYBENZAZOLE ARTICLES

BACKGROUND OF THE INVENTION

This application relates to the art of making polybenzazole films, three-dimensional shaped articles and other shaped articles except for fibers.

It is well-known to polymerize polybenzazole polymers in polyphosphoric acid solutions, so that an acid dope is formed. See, e.g., Wolfe et al., U.S. Pat. No. 4,533,693 (Aug. 5, 1985) which is incorporated herein by reference. Frequently, the resulting polymers are not thermoplastic. However, they can be made into shaped articles such as films, coatings and net-shaped parts by: (a) forming the desired shaped article out of the dope; (b) coagulating the polymer in the shaped article; and (c) leaching (or washing) residual phosphoric acid out of the coagulated article. See, e.g., Harvey et al., U.S. Pat. No. 4,973,442 (Nov. 27, 1990), which is incorporated herein by reference.

The coagulation and leaching steps can become a significant bottleneck in a continuous production process, because they are very time-consuming. Commercially desirable films should contain no more than about 2000–2500 ppm phosphorus, and film for very sensitive uses should contain 250 ppm phosphorus or less. On the other hand, the Harvey patent shows that film washed in water for 5 minutes contains 4 weight percent phosphorus, and film washed for 48 hours still contains 0.8 weight percent phosphorus. The long leaching times needed to reach acceptable levels of phosphorus are unmanageable in a commercial production.

What is needed is an accelerated process to coagulate and leach non-fiber polybenzazole articles.

SUMMARY OF THE INVENTION

The present invention is a process to coagulate, wash and leach a shaped polybenzazole article, comprising the steps of:

(1) contacting a shaped article, other than a fiber, that contains a dope containing polybenzazole polymer and polyphosphoric acid, with an acidic liquid coagulant, (2) optionally contacting the shaped article with a second liquid having a pH higher than the acidic liquid coagulant, and (3) contacting the shaped article with a hot leaching fluid, that is capable of removing residual phosphorous compounds, at a temperature of at least about 60° C., for a combined residence time in steps (1), (2) and (3) of no more than about 35 minutes, whereby a polybenzazole article containing no more than about 2000 ppm phosphorus is formed.

The process of this invention makes shaped articles with low phosphorus content in a relatively short time. At optimum conditions, it can make articles with acceptable phosphorus levels (no more than about 2000 ppm) in about 5 minutes or less, or it can make articles with very low phosphorus (100 ppm or less) in slightly longer time (30 minutes). The films and other shaped articles can be used in electronic and structural applications.

DETAILED DESCRIPTION OF THE INVENTION

The present invention uses polybenzoxazole (PBO) or polybenzothiazole (PBT) polymers or copolymers that are polymerized in a mixture containing polyphosphoric acid. PBO, PBT and random, sequential and block copolymers of PBO and PBT are described in references such as Wolfe et al., *Liquid Crystalline Polymer Compositions, Process and Products*, U.S. Pat. No. 4,703,103 (Oct. 27, 1987); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985); Evers, *Thermo-oxadatively Stable Articulated p-Benzobisoxazole and p-Benzobisthiazole Polymers*, U.S. Pat. No. 4,359,567 (Nov. 16, 1982); Tsai et al., *Method for Making Heterocyclic Block Copolymer*, U.S. Pat. No. 4,578,432 (Mar. 25, 1986); 11 Ency. Poly. Sci. & Eng., *Polybenzothiazoles and Polybenzoxazoles*, 601 (J. Wiley & Sons 1988) and W. W. Adams et al., *The Materials Science and Engineering of Rigid-Rod Polymers* (Materials Research Society 1989), which are incorporated herein by reference.

The polymer may contain AB-mer units, as represented in Formula 1(a), and/or AA/BB-mer units, as represented in Formula 1(b)

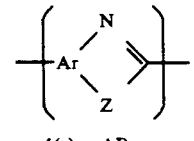

1(a) AB

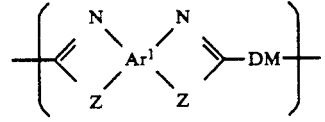

1(b) AA/BB wherein:

Each Ar represents an aromatic group. The aromatic group may be heterocyclic, such as pyridinylene group, but it is preferably carbocyclic. The aromatic group may be a fused or unfused polycyclic system, but is preferably a single six-membered ring. Size is not critical, but the aromatic group preferably contains no more than about 18 carbon atoms, more preferably no more than about 12 carbon atoms and most preferably no more than about 6 carbon atoms. Examples of suitable aromatic groups include phenylene moieties, tolylene moieties, biphenylene moieties and bis-phenylene ether moieties. $Ar^1$ in AA/BB-mer units is preferably a 1,2,4,5-phenylene moiety or an analog thereof. Ar in AB-mer units is preferably a 1,3,4-phenylene moiety or an analog thereof.

Each Z is independently an oxygen or a sulfur atom.

Each DM is independently a bond or a divalent organic moiety that does not interfere with the synthesis, fabrication or use of the polymer. The divalent organic moiety may contain an aliphatic group, which preferably has no more than about 12 carbon atoms, but the divalent organic moiety is preferably an aromatic group (Ar) as previously described. It is most preferably a 1,4-phenylene moiety or an analog thereof.

The nitrogen atom and the Z moiety in each azole ring are bonded to adjacent carbon atoms in the aromatic group, such that a five-membered azole ring fused with the aromatic group is formed.

The azole rings in AA/BB-mer units may be in cis- or trans-position with respect to each other, as illustrated in 11 Ency. Poly. Sci. & Eng., supra, at 602, which is incorporated herein by reference.

The polymer preferably consists essentially of either AB-PBZ mer units or AA/BB-PBZ mer units, and more preferably consists essentially of AA/BB-PBZ mer units. The polybenzazole polymer may be rigid rod, semi-rigid rod or flexible coil. It is preferably a lyotropic liquid-crystalline polymer, which forms liquid crystalline domains in solution when its concentration exceeds a "critical concentration point." It is preferably rigid rod in the case of an AA/BB-PBZ polymer or semi-rigid in the case of an AB-PBZ polymer. Azole rings within the polymer are preferably oxazole rings (Z=O). Preferred mer units are illustrated in Formulae 2(a)–(h). The polymer more preferably consists essentially of mer units selected from those illustrated in 2(a)–(h), and most preferably consists essentially of a number of identical units selected from those illustrated in 2(a)–(d).

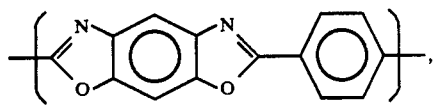
(a)

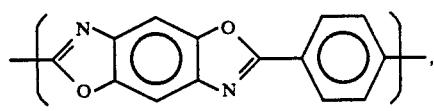
(b)

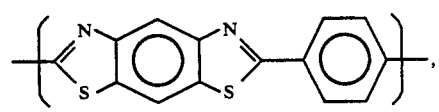
(c)

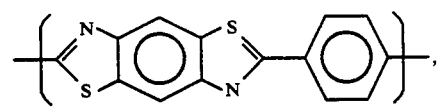
(d)

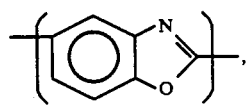
(e)

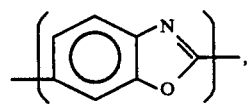
(f)

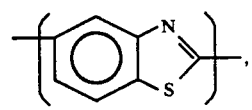
(g)

and

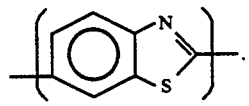
(h)

Each polymer preferably contains on average at least about 25 mer units, more preferably at least about 50 mer units and most preferably at least about 100 mer units. The intrinsic viscosity of rigid AA/BB-PBZ polymers in methanesulfonic acid at 25° C. is preferably at least about 10 dL/g, more preferably at least about 15 dL/g and most preferably at least about 20 dL/g. For some purposes, an intrinsic viscosity of at least about 25 dL/g or 30 dL/g may be best. Intrinsic viscosity of 60 dL/g or higher is possible, but the intrinsic viscosity is preferably no more than about 50 dL/g. The intrinsic viscosity of semi-rigid AB-PBZ polymers is preferably at least about 5 dL/g, more preferably at least about 10 dL/g and most preferably at least about 15 dL/g.

The dope should contain a high enough concentration of polymer for the polymer to coagulate to form a solid article. When the polymer is lyotropic liquid-crystalline, then the concentration of polymer in the dope is preferably high enough to provide a liquid-crystalline dope. The concentration of the polymer is preferably at least about 7 weight percent, more preferably at least about 10 weight percent and most preferably at least about 14 weight percent. The maximum concentration is limited primarily by practical factors, such as polymer solubility and dope viscosity. The concentration of polymer is seldom more than 30 weight percent, and usually no more than about 20 weight percent.

Suitable polymers or copolymers and dopes can be synthesized by known procedures, such as those described in Wolfe et al., U.S. Pat. No. 4,533,693 (Aug. 6, 1985); Sybert et al., U.S. Pat. No. 4,772,678 (Sep. 20, 1988); Harris, U.S. Pat. No. 4,847,350 (Jul. 11, 1989); and Gregory et al., U.S. Pat. No. 5,089,591 (Feb. 18, 1992), which are incorporated herein by reference. In summary, suitable monomers (AA-monomers and BB-monomers or AB-monomers) are reacted in a solution of nonoxidizing and dehydrating acid under nonoxidizing atmosphere with vigorous mixing and high shear at a temperature that is increased in step-wise or ramped fashion from no more than about 120° C. to at least about 190° C. Examples of suitable AA-monomers include terephthalic acid and analogs thereof. Examples of suitable BB-monomers include 4,6-diaminoresorcinol, 2,5-diaminohydroquinone, 2,5-diamino-1,4-dithiobenzene and analogs thereof, typically stored as acid salts. Examples of suitable AB-monomers include 3-amino-4-hydroxybenzoic acid, 3-hydroxy-4-aminobenzoic acid, 3-amino-4-thiobenzoic acid, 3-thio-4-aminobenzoic acid and analogs thereof, typically stored as acid salts.

The dope is formed into a shaped article (other than a fiber). For instance, films can be shaped by extruding the dope through a slit or tubular die and optionally stretching the dope film in the machine and/or transverse directions. Examples of suitable processes are shown in Harvey et al., U.S. Pat. No. 4,973,442 (Nov. 27, 1990); Chenevey et al., U.S. Pat. No. 4,898,924 (Feb. 6, 1990); and Pierini et al., U.S. Ser. No. 937,327 (filed Aug. 27, 1992), which are incorporated herein by reference.

The shaped article is coagulated and residual solvent is leached out by a multi-step process. (The term "coagulation" is commonly used in the art to describe the step in which dope is initially contacted with a fluid that precipitates the polymer from solution and removes part of the solvent. The term "leaching" is commonly used in the art to describe the step of subsequently washing almost all of the residual solvent from the coagulated polymer. The term "coagulation" does not necessarily imply that the dope is a flowing liquid and changes into a solid phase. The dope may be at a temperature low enough so that it is essentially non-flowing before the coagulation step begins.)

In the first (coagulation) step, the shaped article is contacted with a acidic liquid coagulant. The acidic liquid coagulant is preferably an aqueous acid solution and more preferably an aqueous phosphoric acid solution. The solution preferably contains at least about 10 weight percent acid, more preferably at least about 20 weight percent acid, and most preferably at least about 30 weight percent acid. It preferably contains no more than about 50 weight percent acid, and more preferably no more than about 40 weight percent acid. The first acidic solution may be at any temperature at which it is liquid (usually about 0°–100° C.). Its temperature is preferably at least about 15° C. and more preferably at least about 25° C. Its temperature is preferably no more than about 50° C. and more preferably no more than about 30° C. The residence time is preferably no more than about 15 minutes, more preferably no more than about 10 minutes, more highly preferably no more than about 5 minutes and most preferably no more than about 1 minute.

The acidic liquid coagulant may be applied in any manner usual for washing films, such as by immersing or spraying. It is preferably circulated to prevent the acid content from exceeding the desirable level.

It is important that the surface of the shaped article should not be allowed to dry after the coagulation step starts and before the leaching step is completed. It is theorized, without intending to be bound, that the wet never-dried surface of the polybenzazole article is relatively porous and provides paths to wash residual phosphorus from inside the article. On the other hand, it is theorized that the pores close when they become dry and do not open even when they become wet again. The closed pores trap residual phosphorus inside the article.

Optionally, the coagulated article may be contacted with one or more washing liquids, which contain less acid than the acidic liquid coagulant prior to the hot leaching step. The washing liquid preferably contains no more than about 25 weight percent acid, more preferably no more than about 20 weight percent and most preferably no more than about 10 weight percent. In all other respects, the washing step has the same description and preferred embodiments as the coagulation step.

Next, the coagulated article is contacted with a hot leaching fluid that is capable of removing residual phosphorous compounds, at a temperature of at least about 60° C. Examples of suitable leaching fluids include hot water, hot liquid organic solvents and steam. Hot water is useful to reach acceptable phosphorus levels quickly. However, steam, very hot liquid organic solvents and superheated water under pressure are better to reach very low phosphorus levels.

The temperature of hot water is preferably at least about 75° C., more preferably at least about 80° C. and most preferably at least about 85° C. The temperature of steam is preferably at least about 100° C., more preferably at least about 150° C. and most preferably at least about 200° C. The temperature of hot organic solvents is preferably at least about 75° C., more preferably at least about 100° C., more highly preferably at least about 150° C. and most preferably at least about 200° C. The maximum temperature is not critical to the invention and depends on practical limitations. It should be low enough that the polybenzazole polymer and the leaching fluid do not decompose. Preferably, when the leaching fluid is a liquid, the temperature is low enough that the liquid does not boil. Usually, the temperature is no more than about 350° C., and most commonly no more than about 300° C.

Hot organic solvent should be selected so that it remains liquid under reaction conditions. Its boiling point is preferably at least about 100° C., more preferably at least about 150° C. and most preferably at least about 200° C. at about atmospheric pressure. It preferably meets at least one of the following qualities: solubility in water of greater than one weight percent, high polarity, and/or ability to form addition complexes with the residual polymerization solvent. Examples of suitable hot organic solvents include: dimethyl sulfoxide, ethylene glycol, propylene carbonate, glycerol and hexyl alcohol.

The pressure during the leaching step is not critical, unless superheated liquids are used. It may optionally be atmospheric pressure, or above or below. It is preferably at least about ambient pressure. Higher pressures may be desirable in order to wash with a liquid at temperatures above its ordinary boiling point. For instance, it may be desirable to wash with water at temperatures of 100° C., 150° C., 200° C. or more under pressures sufficient to keep the water in a liquid state. It may also be desirable to maintain a pressure difference across a film, so that the hot leaching fluid passes through the film from one side to the other.

The hot leaching fluid may be applied in a single zone or in multiple zones. When it is a liquid it may be applied in an ordinary manner, such as spraying or immersing in baths. When it is steam it may be applied in an ordinary manner, such as by steam jets.

The article is preferably under tension in at least one direction during at least part of the washing process. The tension is more preferably applied in both the machine and the transverse directions during at least the initial part of the coagulation step. More preferably, tension is also applied during the leaching step, particularly when the fluid temperature is very high. The tension is preferably sufficient to prevent the article from shrinking, relaxing or curling.

The residence time in contact with the hot leaching fluid is preferably no more than about 15 minutes, more preferably no more than about 10 minutes, more highly preferably no more than about 5 minutes and most preferably no more than about 2 minutes. The total residence time for coagulation, washing (if done) and leaching is preferably no more than about 20 minutes, more preferably no more than about 15 minutes, more highly preferably no more than about 10 minutes and most preferably no more than about 5 minutes.

The leached article contains high quantities of water, frequently more than 50 weight percent. After the process is completed, the film may optionally be dried and heat-treated according to known methods, such as those described in Harvey et al., U.S. Pat. No. 4,973,442

(Nov. 27, 1990) and Chenevey et al., U.S. Pat. No. 4,898,924 (Feb. 6, 1990), which are incorporated herein by reference. For example, it may be dried in a vacuum or circulating oven, preferably under sufficient tension in the transverse and machine directions to prevent shrinkage or curling. Films can be used in structural applications such as honeycomb, as a layer in a circuit board, or as a magnetic media substrate. Other shaped articles may be used in structural applications.

The residual phosphorus content of the shaped article varies depending upon the time and the process conditions. For a shorter leaching process, the residual phosphorus content is preferably no more than about 1500 ppm, more preferably no more than about 1000 ppm and most preferably no more than about 500 ppm. For a somewhat longer process, it is preferably no more than about 200 ppm, more preferably no more than about 150 ppm, more highly preferably no more than about 100 ppm and most preferably no more than about 50 ppm. (Residual phosphorus measurements are based upon the weight of the film after it has been substantially dried. Phosphorus can be measured using X-ray fluorescence techniques described in E. P. Bertin, *Principles and Practice of X-Ray Spectrometric Analysis—Second Ed.* (Plenum Press 1984), which is incorporated herein by reference. Suitable equipment is commercially available under the tradename KEVEX 770 XRF and from Philips Electronic Instruments.)

When the dried article is a film, it may be a sheet or a thin film (sheet is usually taken as more than about 10–15 mil thickness, and film as no more than about 10–15 mil thickness). It may have biaxially balanced properties or uniaxially unbalanced properties.

The invention is further illustrated by the following illustrative examples:

ILLUSTRATIVE EXAMPLES

The following examples are for illustrative purposes only, and should not be taken as limiting the scope of either the specification or the claims. Unless otherwise stated, all parts and percentages are by weight. (PPM = parts per million by weight)

Residual phosphorus is measured using X-ray fluorescence (XRF) on 1.25 inch diameter samples cut from the film.

EXAMPLE 1

Hot Water Leaching Process

Several films of dope containing 14 weight percent cis-PBO polymer (represented by Formula 1(a)) in polyphosphoric acid are extruded. The films are stretched to 5 times their original width and length. The films are mounted on a hoop and immersed for 1 min. in a solution containing about 30 weight percent aqueous phosphoric acid. The films are immediately immersed in deionized water at about 85° C. for the time shown in Table I. The films are dried at 100° C. for about eighteen hours, and the phosphorus content is measured. The results are set out in Table 1.

TABLE I

| Sample | Immersion Time (min.) | Phosphorus (ppm) |
|---|---|---|
| a | 1 | 1400 +/− 200 |
| b | 3 | 1200 +/− 100 |
| c | 5 | 1500 +/− 500 |
| d | 10 | 1000 +/− 100 |
| e | 20 | 840 +/− 100 |

EXAMPLE 2

Staged Hot Water Leaching Process

Dope films are made, mounted and immersed in aqueous phosphoric acid solution as described in Example 1. Three baths of deionized water at 95° C.–100°.C. are set up, and the film is immersed in each bath sequentially without drying as shown in Table II. The films are dried and residual phosphorus is measured. The results are shown in Table II.

TABLE II

| Sample | Immersion Time in Aq. Acid (min.) | Immersion Time - 1st Hot Bath (min.) | Immersion Time - 2nd Hot Bath (min.) | Immersion Time - 3rd Hot Bath (min.) | Residual Phosphorus (ppm) |
|---|---|---|---|---|---|
| f | 1 | 10 | 10 | 10 | 899 |
| g | 1 | 5 | 5 | 5 | 969 |
| h | 1 | 1 | 1 | 1 | 1131 |

EXAMPLE 3

Convective Steam Leaching Process

Dope films that contain about 14 weight percent cis-PBO (about 32 I.V. in methanesulfonic acid at 25° C.) are extruded. The dope films are stretched to 5 times their original length and width. The stretched film thickness is about 2 mil. The stretched films are mounted on hoops and immersed for 5 minutes in an aqueous phosphoric acid solution having the concentration shown in Table III. The films are washed for 5 minutes in room temperature deionized water.

Samples of film are mounted in a high pressure filter assembly, making sure that the film remains wet throughout. The holder is positioned with the exit up at a 45° angle from horizontal. Steam at 40–45 psig is pumped into the entrance port, and condensate is drained periodically with a valve near the entrance port. Water is kept in the exit line to keep the back side of the film wet. Steam can be seen exiting through the exit side. After a period of time shown in Table III, the film is dried overnight at room temperature and phosphorus is measured. The results are shown in Table III.

TABLE III

| Sample | Percent Acid in 1st Bath (%) | Time under Steam (min.) | Residual Phosphorus (ppm) |
|---|---|---|---|
| i | 15 | 5 | 675 |
| j | 15 | 15 | 434 |
| k | 15 | 30 | 106 |
| l | 30 | 5 | 158 |
| m | 30 | 15 | 124 |
| n | 30 | 30 | 89 |

EXAMPLE 4

Hot Solvent Leaching Process

Dope films that contain about 14 weight percent cis-PBO are extruded with a 40 mil thickness. The films are stretched to four times their original length and width. Samples of the stretched films are mounted on 4.5 inch diameter hoops and immersed for 1 minute in a 30 weight percent aqueous phosphoric acid solution. The samples are then immersed for 30 minutes in 3000 ml of hot organic solvent solution as shown in Table IV. The samples are dried at 100° C. for 18 hours, and their phosphorus content is measured and shown in Table IV.

TABLE IV

| Sample | Organic Solvent Solution | Solvent Temp (°C.) | Residual Phosphorus (ppm) |
|---|---|---|---|
| o | 25 parts ethylene glycol/ 10 parts water | 120–122 | 280 |
| p | 1 part ethylene glycol/ 1 part tetraethylene glycol | 188–192 | 111 |

What is claimed is:

1. A process to coagulate, wash and leach a shaped polybenzazole article, comprising the steps of:
   (1) contacting a shaped article, other than a fiber, that contains a dope containing polybenzazole polymer and polyphosphoric acid, with a acidic liquid coagulant, and
   (2) contacting the shaped article, before substantial drying, with a leaching fluid, that is capable of removing residual phosphorous compounds, at a temperature of at least about 60° C., for a combined residence time in steps (1) and (2) of no more than about 35 minutes, whereby a polybenzazole article containing no more than about 2000 ppm phosphorus is formed.

2. The process of claim 1 wherein the acidic liquid coagulant is an aqueous acid solution.

3. The process of claim 2 wherein the acidic liquid coagulant contains from about 10 to about 50 weight percent acid.

4. The process of claim 3 wherein the acid is phosphoric acid.

5. The process of claim 1 wherein the leaching fluid is water.

6. The process of claim 5 wherein the leaching fluid has a temperature of at least about 75° C.

7. The process of claim 5 wherein the leaching fluid has a temperature of at least about 85° C.

8. The process of claim 1 wherein the leaching fluid is a hot organic solvent.

9. The process of claim 8 wherein the hot organic solvent has a temperature of at least about 100° C.

10. The process of claim 8 wherein the hot organic solvent has a temperature of at least about 150° C.

11. The process of claim 1 wherein the leaching fluid is steam.

12. The process of claim 11 wherein the steam has a temperature of at least about 150° C.

13. The process of claim 11 wherein the steam has a temperature of at least about 200° C.

14. The process of claim 1 wherein the total residence time in steps (1) and (2) is no more than about 15 minutes.

15. The process of claim 1 wherein the total residence time in steps (1) (2) is no more than about 5 minutes.

16. The process of claim 1 wherein the residual phosphorus is no more than about 1000 ppm.

17. The process of claim 1 wherein the residual phosphorus is no more than about 500 ppm.

18. A process to coagulate, wash and leach a shaped polybenzazole article, comprising the steps of:
    (1) contacting a shaped article, other than a fiber, that contains a dope containing polybenzazole polymer and polyphosphoric acid, with an aqueous solution containing 10 to 50 weight percent acid, and
    (2) contacting the shaped article, before substantial drying, with steam, water at a temperature of at least about 75° C., or an organic solvent that is capable of removing residual phosphorous compounds at a temperature of at least about 75° C., for a combined residence time in steps (1) and (2) of no more than about 5 minutes, whereby a polybenzazole article containing no more than about 2000 ppm phosphorus is formed.

19. The process of claim 18 wherein the polybenzazole polymer is lyotropic liquid crystalline polybenzoxazole or polybenzothiazole and the dope is liquid crystalline.

20. The process of claim 19 that further comprises the following step, performed after step (1) and prior to step (2):
    (1a) contacting the shaped article with a second liquid having a pH higher than the acidic liquid coagulant and wherein the combined residence time in steps (1), (1a) and (2) is no more than about 5 minutes.

21. The process of claim 1 that further comprises the following step, performed after step (1) and prior to step (2):
    (1a) contacting the shaped article with a second liquid having a pH higher than the acidic liquid coagulant and wherein the combined residence time in steps (1), (1a) and (2) is no more than about 35 minutes.

22. The process of claim 21 wherein the combined residence time in steps (1), (1a) and (2) is no more than about 15 minutes.

23. The process of claim 21 wherein the combined residence time in steps (1), (1a) and (2) is no more than about 5 minutes.

* * * * *